(12) United States Patent
Ichinose

(10) Patent No.: US 8,977,403 B2
(45) Date of Patent: Mar. 10, 2015

(54) REMOTE MONITORING APPARATUS, WIND TURBINE GENERATOR SYSTEM, AND METHOD OF CONTROLLING REMOTE MONITORING APPARATUS

(75) Inventor: Hidekazu Ichinose, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 741 days.

(21) Appl. No.: 13/232,307

(22) Filed: Sep. 14, 2011

(65) Prior Publication Data

US 2012/0066544 A1  Mar. 15, 2012

Related U.S. Application Data

(63) Continuation of application No. PCT/JP2011/064295, filed on Jun. 22, 2011.

(30) Foreign Application Priority Data

Jun. 22, 2011  (JP) ................................. 2011-138031

(51) Int. Cl.
| | |
|---|---|
| *G05B 9/02* | (2006.01) |
| *G06F 11/20* | (2006.01) |
| *H04L 12/24* | (2006.01) |
| *H04L 29/08* | (2006.01) |
| *H04L 29/14* | (2006.01) |

(52) U.S. Cl.
CPC ........ *G06F 11/2005* (2013.01); *H04L 41/0663* (2013.01); *H04L 67/125* (2013.01); *H04L 69/40* (2013.01); *Y04S 40/166* (2013.01)
USPC ................ 700/287; 700/21; 700/79

(58) Field of Classification Search
None
See application file for complete search history.

(56) References Cited

U.S. PATENT DOCUMENTS

| | | | |
|---|---|---|---|
| 6,925,385 B2 * | 8/2005 | Ghosh et al. ..................... 702/14 |
| 7,318,154 B2 * | 1/2008 | Tehee, Jr. ....................... 713/155 |
| 8,058,753 B2 * | 11/2011 | Achilles et al. ................ 307/153 |
| 8,244,260 B2 * | 8/2012 | Silverstrim et al. ........... 455/447 |
| 2004/0230377 A1 | 11/2004 | Ghosh et al. |

(Continued)

FOREIGN PATENT DOCUMENTS

| | | |
|---|---|---|
| CN | 1545268 A | 11/2004 |
| CN | 1761124 A | 4/2006 |

(Continued)

OTHER PUBLICATIONS

Phoenix Contact "Solutions for Wind Turbine Systems" Apr. 15, 2009.*

(Continued)

*Primary Examiner* — Ryan Jarrett
(74) *Attorney, Agent, or Firm* — Kanesaka, Berner & Partners

(57) ABSTRACT

A SCADA system includes a main switching hub and a backup switching hub that relay transmission data between a wind turbine generator and terminals provided in another SCADA system and client terminals, and a network switch for performing switching between the main switching hub and the backup switching hub for relaying transmission data between the wind turbine generator and the terminals. A backup remote I/O connected to the backup switching hub causes the network switch to perform switching based on a switching command from a SCADA terminal input via the backup switching hub. This serves to solve a data transmission problem caused by a problem in a switching hub on the wind turbine generator side from a remote location.

7 Claims, 15 Drawing Sheets

(56) References Cited

U.S. PATENT DOCUMENTS

| | | |
|---|---|---|
| 2006/0100748 A1* | 5/2006 | Schubert ............... 700/286 |
| 2009/0187283 A1* | 7/2009 | Laursen et al. ............ 700/287 |
| 2009/0204266 A1* | 8/2009 | Lovmand et al. .......... 700/287 |
| 2010/0124498 A1* | 5/2010 | Kabatzke et al. ............ 416/61 |
| 2010/0133815 A1* | 6/2010 | Middendorf et al. ........ 290/44 |
| 2010/0135788 A1 | 6/2010 | Qu |
| 2010/0138059 A1 | 6/2010 | Kumar et al. |
| 2010/0182926 A1 | 7/2010 | Kubota |
| 2011/0020122 A1* | 1/2011 | Parthasarathy et al. ...... 416/61 |
| 2011/0125336 A1* | 5/2011 | Groves et al. ............. 700/287 |
| 2011/0145277 A1 | 6/2011 | Gadre et al. |
| 2012/0020786 A1* | 1/2012 | Ayres ......................... 416/1 |
| 2012/0191249 A1* | 7/2012 | Zapata et al. ............. 700/275 |

FOREIGN PATENT DOCUMENTS

| | | |
|---|---|---|
| CN | 101246367 A | 8/2008 |
| CN | 102032111 A | 4/2011 |
| JP | 2002-247017 A | 8/2002 |
| JP | 2005168144 A | 6/2005 |
| JP | 2005204178 A | 7/2005 |
| JP | 2009164758 A | 7/2009 |

OTHER PUBLICATIONS

Office Action corresponding to JP 2011-138031, dated Oct. 2, 2012.
International Search Report of PCT/JP2011/064295 dated Sep. 27, 2011.
Shigeru Tamura et al., "Information and Control Management System for Secure Electric Power Supply", The Hitachi Hyoron, vol. 81, No. 2, pp. 15-20 (Feb. 1, 1999).
Mitsuo Ogata et al., "Substation Monitoring and Control System", Toshiba Gijutu Kokai-syu, Published No. 2002-0617, 20-14, pp. 79-82 (Mar. 18, 2002).
Office Action mailed Aug. 5, 2014, corresponding to Chinese patent application No. 201180004360.3.
Extended European Search Report issued Nov. 24, 2014, corresponding to European patent application No. 11817499.4.

* cited by examiner

FIG. 13

| MAINTENANCE OPERATION | CONTROL OIL SYSTEM (1) | | |
|---|---|---|---|
| CONTROL OIL PUMP | | ON | OFF |
| PUMP DAMPING VALVE | AUTOMATIC | ACTIVATE (EXCITED) | EMERGENCY STOP (UNEXCITED) |
| CONTROL-OIL COOLING PUMP | AUTOMATIC | ON | OFF |
| ACC DISCHARGE VALVE | | DISCHARGE (EXCITED) | CHARGE (UNEXCITED) |
| CONTROL-OIL-TANK HEATER | | ON | OFF |
| CONTROL-OIL SURFACE LEVEL | LOW | PITCH-ACC GAS PRESSURE | 17.59 Mpa |
| CONTROL-OIL PRESSURE | NORMAL | BRAKE-ACC GAS PRESSURE | 23.72 Mpa |
| CONTROL-OIL PRESSURE | 17.61 Mpa | BRAKE-LINE PRESSURE | 0.00 Mpa |
| | | CONTRL-OIL-TANK TEMPERATURE | 41.8 °C |

WIND SPEED (AVERAGE)  3.0(2.5)m/s
WIND DIRECTION (DEVIATION)  2.5deg
ROTOR ROTATION SPEED  0.0rpm
OUTPPUT  0.0kW

MONITOR

| MAINTENANCE OPERATION | COOLING SYSTEM | | |
|---|---|---|---|
| CONVERTER COOLING PUMP | | ON | OFF |
| CONVERTER-COOLING-WATER COOLING FAN | AUTOMATIC | ON | OFF |
| BOOST-TRANSFORMER COOLING FAN | AUTOMATIC | ON | OFF |
| OUTSIDE AIR TEMPERATURE | 16.5 °C | TEMPERATURE AT CONVERTER-COOLING-WATER INTAKE PORT | 34.0 °C |
| TEMPERATURE INSIDE NACELLE | 18.5 °C | TEMPERATURE IN THE VICINITY OF BOOST-TRANSFORMER WINDING | 37.5 °C |
| TEMPERATURE INSIDE HUB | 27.3 °C | HIGHEST VALUE   RESET | 40.0 °C |
| COOLING-WATER FEEDING PRESSURE | 59.7 Mpa | TEMPERATURE IN BOOST-TRANSFORMER ROOM | 42.7 °C |
| COOLING-WATER RETURNING PRESSURE | 59.7 Mpa | COOLING-WATER FLOW LEVEL | 59.7 L/min |

WIND SPEED (AVERAGE)       3.0(2.5)m/s
WIND DIRECTION (DEVIATION)   2.5deg
ROTOR ROTATION SPEED        0.0rpm
OUTPPUT                     0.0kW

MONITOR

~78C

REMOTE MONITORING APPARATUS, WIND TURBINE GENERATOR SYSTEM, AND METHOD OF CONTROLLING REMOTE MONITORING APPARATUS

CROSS REFERENCE TO RELATED APPLICATIONS

This is a continuation of International Application PCT/JP2011/064295, with an international filing date of Jun. 22, 2011, which is hereby incorporated by reference herein in its entirety.

TECHNICAL FIELD

The present invention relates to a remote monitoring apparatus, a wind turbine generator system, and a method of controlling a remote monitoring apparatus.

BACKGROUND ART

In a wind farm constituted of multiple wind turbine generators, a SCADA (Supervisory Control And Data Acquisition) system is used as a remote monitoring apparatus for monitoring the operating status of the wind turbine generators.

In such a wind farm, the SCADA system and the wind turbine generators are connected to each other via a communication circuit (e.g., an Ethernet (registered trademark)-based communication network).

As an example of such a configuration, in a system described in PTL 1, a SCADA master server is provided in a wind farm, a SCADA remote client provided in a remote control center is connected via a communication network, and a SCADA remote client is connected to a workstation via the Internet.

There are cases where data transmission becomes difficult when a problem occurs in a communication network.

As a countermeasure against a problem in a communication circuit, in a communication system described in PTL 2, a POS terminal and a host system are connected to each other via two different types of communication circuit, namely, a closed IP network and an ISDN switching network, and switching is performed to use the ISDN switching network when a problem occurs in the closed IP network.

There are also cases where, in order to deal with a problem in a communication circuit, a switching hub for connecting to a communication network is provided in a wind turbine generator, and a ring topology is formed in a wind farm to achieve redundancy.

When the switching hub on the wind power generator side, implementing the ring topology, experiences a problem or failure, the problem or the failure can be solved by performing a power reset of the switching hub in some cases. There are two methods of rebooting the switching hub by a power reset. A first method is to send a reset command via a network to the switching hub on the wind turbine generator side from a terminal (information processing apparatus) in a control center at a remote location. A second method is to let a maintenance worker visit the wind turbine generator and power off and then power on the switching hub.

CITATION LIST

Patent Literature

{PTL 1} United States Patent Application, Publication No. 2010/0135788

{PTL 2} Japanese Unexamined Patent Application, Publication No. 2009-164758

SUMMARY OF INVENTION

Technical Problem

However, with the first method, it is not possible to solve a problem by sending a command from a remote location when the switching hub on the wind turbine generator side cannot receive a command via a communication network, i.e., when a communication network is not established (when there is no response to a ping command). On the other hand, with the second method, when the switching hub provided on the side of multiple wind turbine generators is experiencing a problem, it is possible that the ring connection is not operating properly. In the case of a wind farm constituted of several tens or even more than one hundred wind turbine generators, it takes time for a maintenance worker to travel from his regular workplace to the wind turbine generators, resulting in a considerable time loss for recovery. In particular, in the case of a wind farm installed on the offshore area, a maintenance worker has to travel by helicopter or ship.

The present invention has been made in view of the situation described above, and it is an object thereof to provide a remote monitoring apparatus, a wind turbine generator system, and a method of controlling a remote monitoring apparatus with which it is possible to solve a data transmission problem caused by a problem in a switching hub on the wind turbine generator side from a remote location.

Solution to Problem

In order to solve the problems described above, a remote monitoring apparatus, a wind turbine generator system, and a method of controlling a remote monitoring apparatus according to the present invention employ the following solutions.

A remote monitoring apparatus according to a first aspect of the present invention is a remote monitoring apparatus that sends and receives data between a wind turbine generator and an information processing apparatus, the remote monitoring apparatus including a main switching hub that relays transmission data between the wind turbine generator and the information processing apparatus, a backup switching hub that relays transmission data between the wind turbine generator and the information processing apparatus, a switching unit for performing switching between the main switching hub and the backup switching hub for relaying transmission data between the wind turbine generator and the information processing apparatus, and a first controlling unit that is connected to the backup switching hub and that causes the switching unit to perform switching based on a switching signal from the information processing or any other information processing apparatus input via the backup switching hub.

With the above configuration, the remote monitoring apparatus sends and receives data between the wind turbine generator and the information processing apparatus. One or more wind turbine generators may be connected to the remote monitoring apparatus, and the information processing apparatus connected to the remote monitoring apparatus is installed at a location remote from the wind turbine generators. Furthermore, the remote monitoring apparatus includes a main switching hub and a backup switching hub that relay transmission data between the wind turbine generator and the information processing apparatus and a switching unit for performing switching between the main switching hub and the backup switching hub for relaying transmission data between the wind turbine generator and the information processing apparatus.

The first controlling unit connected to the backup switching hub causes the switching unit to perform switching based on a switching signal from the information processing apparatus or any other information processing apparatus input via the backup switching hub.

Normally, data transmission between the wind turbine generator and the information processing apparatus is performed via the main switching hub. Even in the normal case, the backup switching hub is powered on.

When a problem occurs in the main switching hub, resulting in a data transmission problem between the wind turbine generator and the information processing apparatus via the main switching hub, the information processing apparatus installed at a remote location sends a switching signal to the backup switching hub for switching from the main switching hub to the backup switching hub. The backup switching hub inputs the switching signal to the first controlling unit, and the first controlling unit controls the switching unit so that the relaying of transmission data between the wind turbine generator and the information processing apparatus is switched from the main switching hub to the backup switching hub.

Accordingly, with the above configuration, a data transmission problem caused by a problem in a switching hub provided on the wind turbine generator side can be solved from a remote location.

In the first aspect, it is preferable that, the first controlling unit powers off and on the main switching hub based on a reset signal from the information processing apparatus or any other information processing apparatus input via the backup switching hub.

With this configuration, since the first controlling unit powers off and on the main switching hub based on a reset signal from the information processing apparatus or any other information processing apparatus input via the backup switching hub, it is possible to perform a power reset of the main switching hub from a remote location.

In the first aspect, it is preferable that the first controlling unit power off and on a wind-turbine controller that controls the wind turbine generator, based on a reset signal from the information processing apparatus or any other information processing apparatus input via the backup switching hub.

With this configuration, since the first controlling unit powers off and on a wind-turbine controller based on a reset signal from the information processing apparatus or any other information processing apparatus input via the backup switching hub, it is possible to perform a power reset of the wind-turbine controller from a remote location.

In the first aspect, it is preferable that the remote monitoring apparatus further include a second controlling unit that is connected to the main switching hub and that powers off and on the backup switching hub based on a reset signal from the information processing apparatus or any other information processing apparatus input via the main switching hub.

With this configuration, since the second controlling unit connected to the main switching hub powers off and on the backup switching hub based on a reset signal from the information processing apparatus or any other information processing apparatus input via the main switching hub, it is possible to perform a power reset of the backup switching hub from a remote location.

Accordingly, if a problem is found in the backup switching hub when the main switching hub is operating properly, it is possible to solve the problem by the power reset, properly maintaining the backup switching hub.

In the first aspect, it is preferable that operating data representing the operating status of the wind turbine generator, received from a wind-turbine controller that controls the wind turbine generator, be sent via a communication circuit to an information processing apparatus installed at a remote location.

With this configuration, since the operating data of the wind turbine generator is sent to the information processing apparatus installed at the remote location, a maintenance worker can collect the operating data of the wind turbine generator and check the operating status in real time at the remote location without visiting the wind turbine generator.

In the first aspect, it is preferable that the main switching hub and the backup switching hub be provided with ports for sending to the wind turbine generator control signals sent from a portable information processing terminal for operating the wind turbine generator.

With this configuration, since control signals for the wind turbine generator from the portable information processing terminal are sent to the wind turbine generator via the main switching hub or the backup switching hub, it is possible to perform various maintenance operations, etc. of the wind turbine generator from a remote location by using the portable information processing terminal.

A wind turbine generator system according to a second aspect of the present invention comprises a wind turbine generator, and a remote monitoring apparatus according to the first aspect of the present invention which are installed on the offshore area, wherein the first controlling unit causes the switching unit to perform switching based on a switching signal from an information processing apparatus installed on land.

A method of controlling a remote monitoring apparatus according to a third aspect of the present invention is a method of controlling a remote monitoring apparatus that includes, for the purpose of sending and receiving data between a wind turbine generator and an information processing apparatus, a main switching hub that relays transmission data between the wind turbine generator and the information processing apparatus, a backup switching hub that relays transmission data between the wind turbine generator and the information processing apparatus, and a switching unit for performing switching between the main switching hub and the backup switching hub for relaying transmission data between the wind turbine generator and the information processing apparatus, wherein switching by the switching unit is performed based on a switching signal from the information processing apparatus or any other information processing apparatus input via the backup switching hub.

Advantageous Effects of Invention

According to the present invention, an advantage is afforded in that it is possible to solve a data transmission problem caused by a problem in a switching hub on the wind turbine generator side from a remote location.

BRIEF DESCRIPTION OF DRAWINGS

FIG. 13 is an illustration showing a maintenance operation screen that is displayed on the HOT when "Control oil system" displayed on the HOT is pressed in the embodiment of the present invention.

FIG. 15 is an illustration showing a maintenance operation screen that is displayed on the HOT when "Cooling system" displayed on the HOT is pressed in the embodiment of the present invention.

DESCRIPTION OF EMBODIMENTS

An embodiment of a remote monitoring apparatus, a wind turbine generator system, and a method of controlling a remote monitoring apparatus according to the present invention will be described hereinbelow with reference to the drawings.

Figure 1:
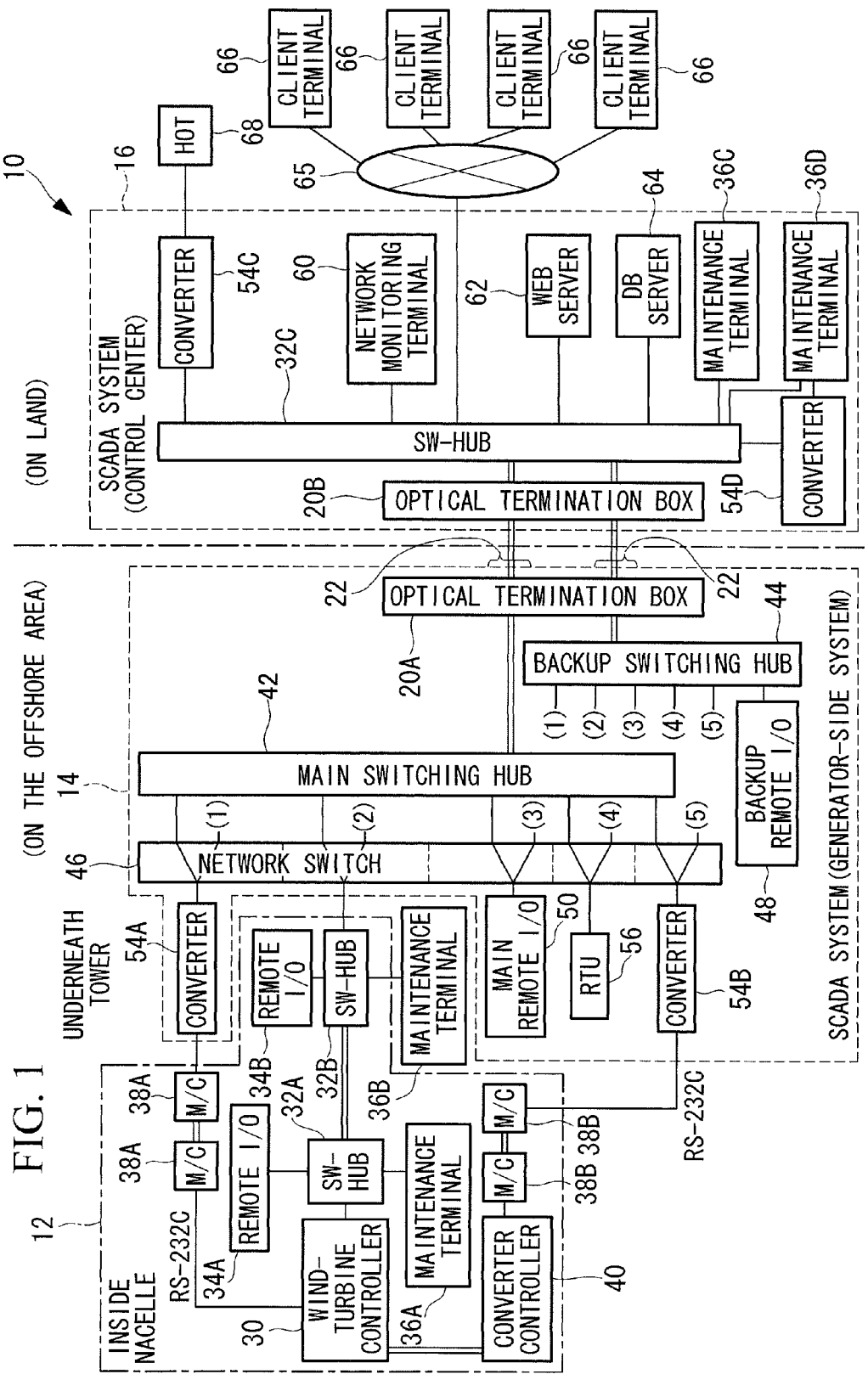
FIG. 1 is a block diagram showing the communication system of a wind turbine generator system according to an embodiment of the present invention.

FIG. 1 is a block diagram showing the communication system of a wind turbine generator system 10 according to the embodiment.

As shown in FIG. 1, the wind turbine generator system 10, which is a wind farm, includes a wind turbine generator 12, a SCADA system (generator-side system) 14, and a SCADA system (control center) 16. In the wind turbine generator system 10 according to this embodiment, for example, the wind turbine generator 12 and the SCADA system 14 are installed on the offshore area. On the other hand, the SCADA system 16 is installed at a substation on land to which electric power is fed from the wind turbine generator 12. Furthermore, the SCADA system 14 and the SCADA system 16 include optical termination box 20A and optical termination box 20B, respectively, so that the SCADA system 14 and the SCADA system 16 can communicate with each other via optical cables 22 (e.g., Ethernet communication).

For example, maintenance workers who maintain the wind turbine generator system 10 regularly work at the SCADA system 16. Alternatively, the maintenance workers may regularly work at locations other than the SCADA system 16.

In this embodiment, the wind turbine generator 12 is configured to send or receive various data via the SCADA system 14 to or from information processing apparatuses (maintenance terminals 36C and 36D) provided in the SCADA system 16 and to or from client terminals 66 so that the wind turbine generator 12 can be controlled in various ways by the maintenance terminals 36C and 36D provided in the SCADA system 16 and by the client terminals 66. The various data here includes operating data (including trip data) sent from the wind turbine generator 12, control signals sent from the maintenance terminals provided in the SCADA system 16 or from the client terminals 66 to control the wind turbine generator 12, etc.

The maintenance terminal 36D is capable of setting signals for trip data of the wind turbine generator 12, modifying control software, collecting and modifying control parameters, setting the date and time for a wind turbine controller 30, which will be described later, collecting and modifying data stored in a non-volatile RAM (NVRAM) in the wind-turbine controller 30, sampling operating data at a higher rate than the SCADA system 14, etc.

Next, the electrical configurations of the wind turbine generator 12, the SCADA system 14, and the SCADA system 16 will be described.

The wind turbine generator 12 includes in its nacelle a wind-turbine controller 30 that controls the wind turbine generator 12 as a whole.

The wind-turbine controller 30 receives input of data output from various devices constituting the wind turbine generator 12 and generates operating data indicating the operating status of the wind turbine generator 12.

The wind-turbine controller 30 is connected to a switching hub (SW-HUB) 32A, and the switching hub 32A is connected to a remote I/O 34A, a maintenance terminal 36A, and a switching hub 32B provided underneath the tower of the wind turbine generator 12.

The switching hubs used in this embodiment also have media converter functions (M/C) for interconnecting different types of transmission media and converting between signals. The standard (protocol, etc.) for communication among devices may be any known communication standard unless otherwise specified explicitly in the following description.

The switching hub 32B is connected to a remote I/O 34B, a maintenance terminal 36B, and a network switch 46 (described later in detail) provided in the SCADA system 14.

Furthermore, the wind-turbine controller 30 can perform serial communication (e.g., RS-232C) with the SCADA system 14 via a media converter 38A.

Furthermore, the wind-turbine controller 30 is connected to a converter controller 40. The converter controller 40 is a controller for a power converter provided in the wind turbine generator 12. The converter controller 40 also generates operating data.

The converter controller 40 can also perform serial communication (e.g., RS-232C) with the SCADA system 14 via a media converter 38B.

The SCADA system 14 includes a main switching hub 42 and a backup switching hub 44 that relay transmission data between the wind turbine generator 12 and terminals provided in the SCADA system 16, and a network switch 46 that performs switching between the main switching hub 42 and the backup switching hub 44 for relaying transmission data between the wind turbine generator 12 and the terminals provided in the SCADA system 16.

Normally, data transmission between the wind turbine generator 12 and the terminals provided in the SCADA system 16 is performed via the main switching hub 42. Even in the normal state, however, the backup switching hub 44 is powered on.

The backup switching hub 44 is connected to a backup remote I/O 48. The backup remote I/O 48 controls switching of the network switch 46 based on switching commands from maintenance terminals and the client terminals 66, input via the backup switching hub 44. The backup remote I/O 48 can power off and on the main switching hub 42 or the wind-turbine controller 30 based on reset commands from maintenance terminals and the client terminals 66, input via the backup switching hub 44.

The main switching hub 42 is connected to a main remote I/O 50. The main remote I/O 50 can power off and on the backup switching hub 44 based on reset commands from maintenance terminals and the client terminals 66, input via the main switching hub 42.

Furthermore, the main remote I/O 50 has a self-diagnosis function for monitoring whether networking with the main system (the transmission system including the main switching hub 42 and the main remote I/O 50) and the backup system (the transmission system including the backup switching hub 44 and the backup remote I/O 48) is operating properly. With the self-diagnosis function, for example, a predetermined signal is sent at predetermined intervals to devices constituting the main system or the backup system to monitor whether networking is operating properly, based on whether signals are returned in response to the predetermined signal.

Figure 2:
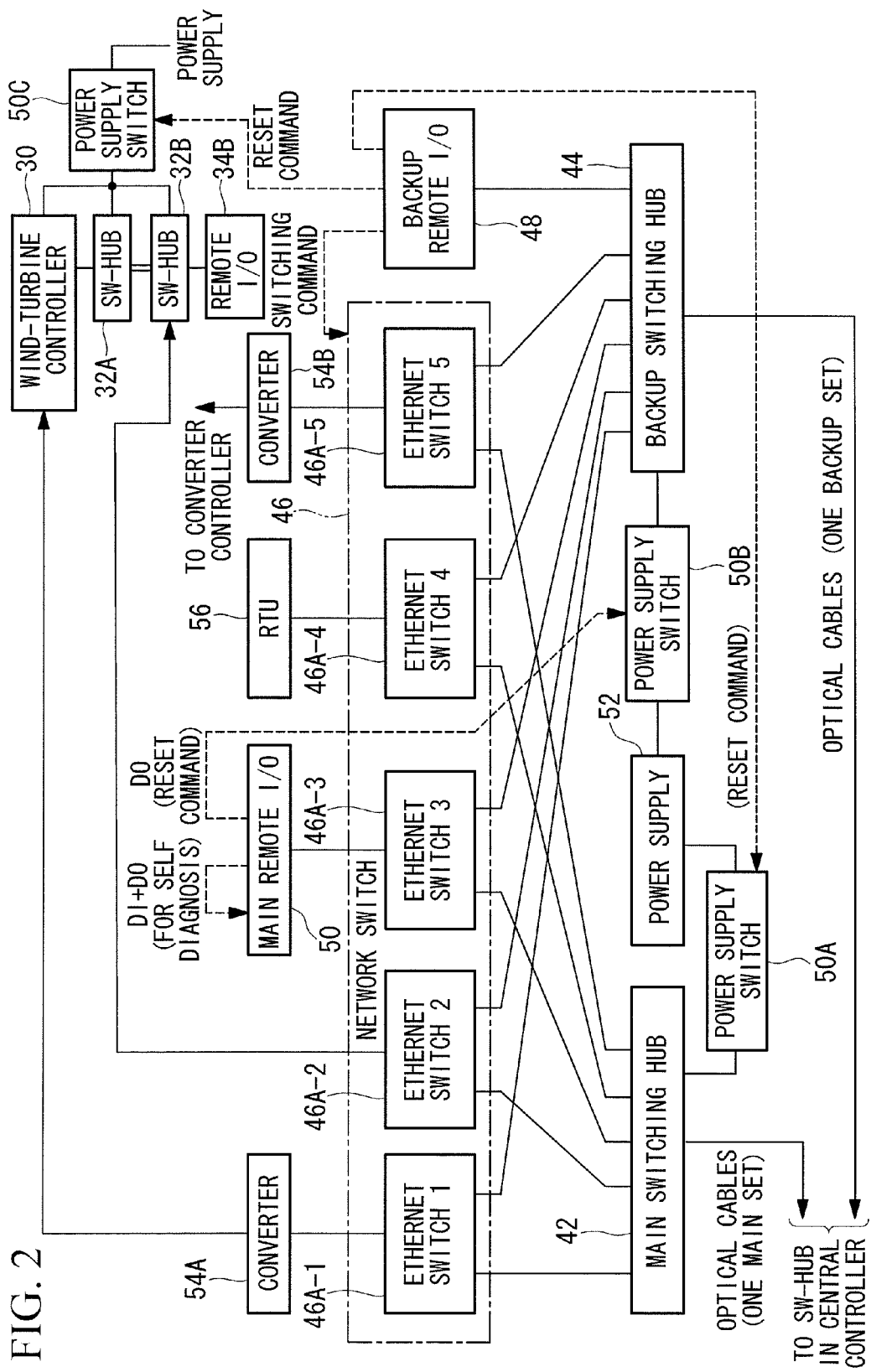
FIG. 2 is a block diagram showing the relationships among devices connected to a main switching hub and a backup switching hub in the embodiment of the present invention.

FIG. 2 is a block diagram showing the relationships among devices connected to the ports of the main switching hub 42 and the backup switching hub 44.

As shown in FIG. 2, the main switching hub 42 and the backup switching hub 44 receive electric power supplied from a power supply 52 via a power supply switch 50A and a power supply switch 50B, respectively.

The power supply switch 50A powers off and on the main switching hub 42 based on reset commands from the backup remote I/O 48 connected to the backup switching hub 44. On the other hand, the power supply switch 50B powers off and on the backup switching hub 44 based on reset commands from the main remote I/O 50 connected to the main switching hub 42.

Furthermore, the wind-turbine controller 30, the switching hub 32A, the switching hub 32B, and the remote I/O 34B receive electric power supplied via a power supply switch 50C. The power supply switch 50C powers off and on the wind-turbine controller 30, the switching hub 32A, the switching hub 32B, and the remote I/O 34B based on reset commands from the backup remote I/O 48 connected to the backup switching hub 44.

Furthermore, although not shown, the backup remote I/O 48 can perform a power reset of the main remote I/O 50, and the main remote I/O 50 can perform a power reset of the backup remote I/O 48.

The main switching hub 42 and the backup switching hub 44 are connected to various devices via the network switch 46. The network switch 46 is constituted of multiple Ethernet switches 46A (Ethernet switches 46A-1 to 46A-5).

Specifically, the main switching hub 42 and the backup switching hub 44 are connected to a converter 54A via the Ethernet switch 46A-1, are connected to the switching hub 32B via the Ethernet switch 46A-2, are connected to the main remote I/O 50 via the Ethernet switch 46A-3, are connected to a remote terminal unit (RTU) 56 via the Ethernet switch 46A-4, and are connected to a converter 54B via the Ethernet switch 46A-5.

The converter 54A performs conversion between serial communication (RS-232C) and Ethernet communication, and is connected to the wind-turbine controller 30 via the media converter 38A.

The RTU 56 sequentially stores operating data transmitted from the wind turbine generator 12.

The converter 54B is connected to the converter controller 40 via the media converter 38B.

Furthermore, the main switching hub 42 and the backup switching hub 44 are individually connected to the optical termination box 20A and are thereby connected to a switching hub 32C provided in the SCADA system 16 via the optical cables 22 and the optical termination box 20B. As the optical cables 22, for example, one set of optical cables is provided for each of the main system and the backup system. However, without limitation to the example, two or more sets of optical cables may be provided for each of the main system and the backup system, or one set of optical cables may be provided commonly for the main system and the backup system.

The switching hub 32C has ports individually connected to a converter 54C, a network monitoring terminal 60, a Web server 62, a DB server 64, the maintenance terminal 36C, the maintenance terminal 36D, and a converter 54D provided in the SCADA system 16 and to the client terminal 66 via the Internet 65.

The converters 54C and 54D perform conversion between Ethernet communication and serial communication. Furthermore, the converter 54C can be connected to a handy operation terminal (HOT) 68, which is a portable information processing terminal for sending control signals for the operation of the wind turbine generator 12 to the wind turbine generator 12 via serial communication.

The network monitoring terminal 60 monitors whether the communication network formed of the SCADA systems 14 and 16 and the wind turbine generator 12 is operating properly by using a known network monitoring protocol (software), etc.

The DB server 64 sequentially stores operating data of the wind turbine generator 12, transmitted via the SCADA system 14.

The maintenance terminal 36C and the client terminals 66 are terminals that can display the operating data transmitted via the SCADA system 14 on their screens via the Web server 62 or send commands to the SCADA system 14 (hereinafter referred to as "SCADA terminals").

The maintenance terminal 36D is a SCADA terminal, similarly to the maintenance terminal 36C. Furthermore, the maintenance terminal 36D can control the operation of the wind turbine generator 12 by sending control signals to the wind turbine generator 12. That is, the maintenance terminal 36D has the function similar to that of the HOT 68 described above. Since the maintenance terminal 36D is connected to the wind turbine generator 12 via the converter 54D for serial communication, the maintenance terminal 36D can sequentially store operating data transmitted from the converter controller 40.

Next, the operation of the wind turbine generator system 10 according to this embodiment in a case where a problem has occurred in data transmission between the wind turbine generator 12 and a terminal provided in the SCADA system 16, i.e., in a case where operating data of the wind turbine generator 12 transmitted via the SCADA system 14 is not displayed on the maintenance terminal 36C or the maintenance terminal 36D, which are SCADA terminals provided in the SCADA system 16, will be described together with a conventional SCADA system.

In a conventional SCADA system, i.e., a SCADA system not provided with the backup switching hub 44, when a problem has occurred in data transmission and a problem has been discovered in a switching hub provided in the SCADA system or a switching hub provided in the wind turbine generator 12, it has been the case that a maintenance worker needs to visit the wind turbine generator 12, which is remote from the worker's regular workplace (control center), and to perform a power reset of the switching hub to recover from the problem. Then, if the problem is not solved even after the power reset, the worker changes or repairs the network device experiencing the problem.

On the other hand, in the case of the SCADA system 14 according to this embodiment, provided with the backup switching hub 44, first, the maintenance worker operates a SCADA terminal, i.e., the maintenance terminal 36C or the maintenance terminal 36D, to send a switching command from the SCADA terminal to the backup switching hub 44. The backup switching hub 44 outputs the switching command to the backup remote I/O 48.

Based on the switching command input via the backup switching hub 44, the backup remote I/O 48 switches the transmission path using the network switch 46. The switching command is either a backup switching command for switching the data transmission path from the main switching hub 42 to the backup switching hub 44 or a main switching command for switching the data transmission path from the backup switching hub 44 to the main switching hub 42.

That is, when a problem has occurred in the main switching hub 42, the backup switching command is input from the SCADA terminal to the backup remote I/O 48 via the backup switching hub 44. Thus, the data transmission path is switched from the main switching hub 42 to the backup switching hub 44, so that the data transmission problem is solved even though the main switching hub 42 is experiencing a problem.

Accordingly, with the wind turbine generator system 10 according to this embodiment, a data transmission problem due to a problem in the main switching hub 42 can be solved from a remote location without requiring a maintenance worker to visit the wind turbine generator 12.

If the problem in the main switching hub 42 is solved subsequently, the main switching command is input from the SCADA terminal to the backup remote I/O 48 via the backup switching hub 44, whereby the data transmission path is switched back from the backup switching hub 44 to the main switching hub 42.

Next, a case where a data transmission problem is solved by a power reset of a network device provided in the wind turbine generator 12 or the SCADA system 14 in the wind turbine generator system 10 according to this embodiment will be described.

Figure 3:
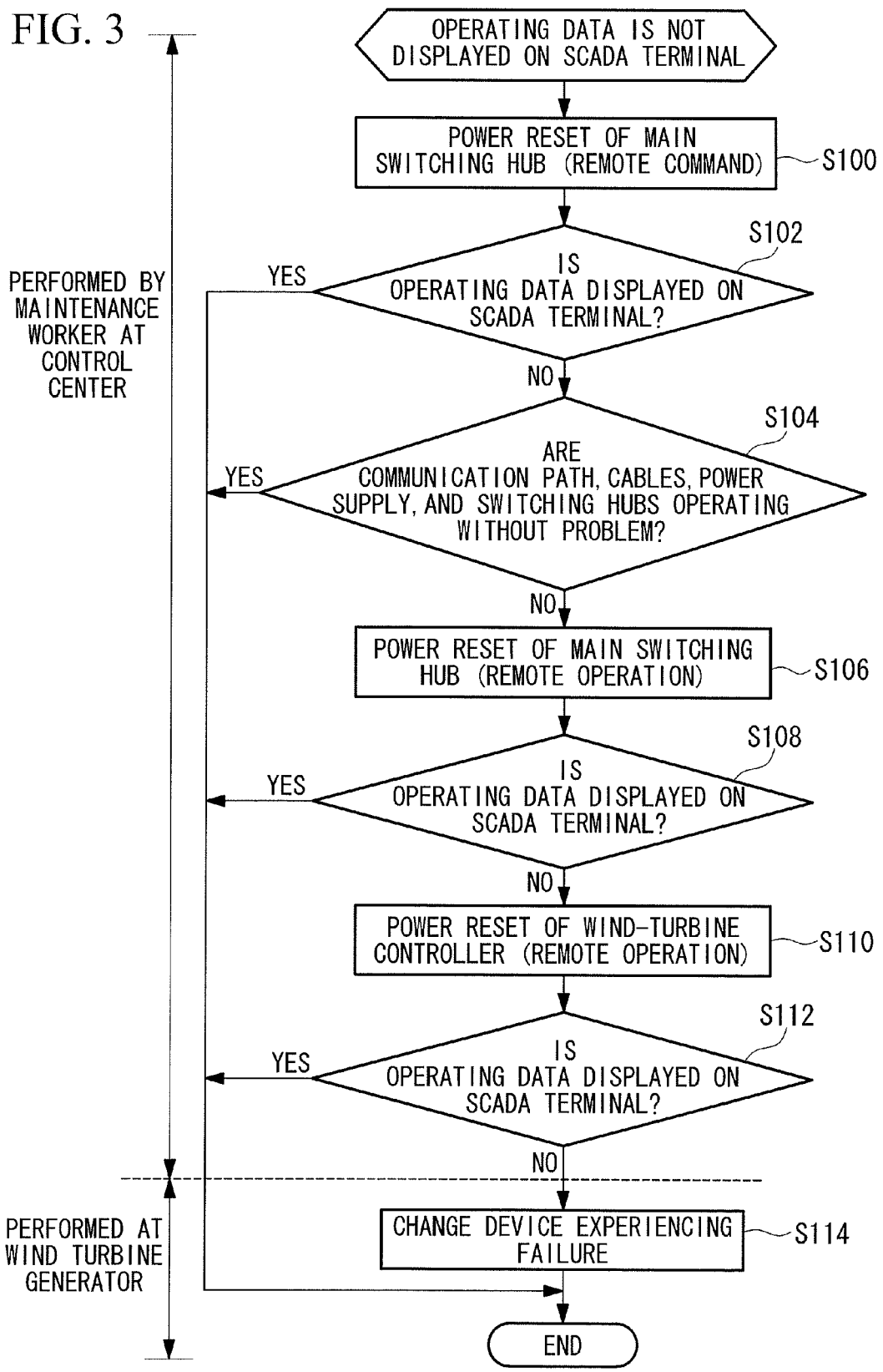
FIG. 3 is a flow chart showing a power reset procedure that is executed when operating data is not displayed on a SCADA terminal in the embodiment of the present invention.

FIG. 3 shows a power reset procedure that is executed when a problem has occurred in the main system, i.e., when operating data is not displayed on a SCADA terminal or when it is assumed that the operation of the wind-turbine controller 30 has stopped. In this case, as a part of failure discovery, the data transmission path is switched from the main switching hub 42 to the backup switching hub 44 between step 104 and step 106 described later.

First, in step 100, a power reset of the main switching hub 42 is performed. The power reset is performed by sending a reset command to the main switching hub 42 by using a remote command from the SCADA terminal.

Then, in step 102, a maintenance worker or the network monitoring terminal 60 checks whether operating data transmitted from the wind turbine generator 12 via the SCADA system 14 is displayed on the SCADA terminal. If the operating data is displayed, the data transmission problem is considered to have been solved, and the procedure is exited. On the other hand, if the operating data is not displayed, the procedure proceeds to step 104.

In step 104, by using the network monitoring terminal 60, etc., the maintenance worker checks whether there is any problem in the communication path, cables, power supply, switching hubs, etc. between the wind turbine generator 12 and the SCADA terminal via the SCADA system 14. If there is no problem, the procedure is exited, and the data transmission problem is solved by solving other causes (failure of the SCADA terminal, etc.). On the other hand, if there is any problem, the procedure proceeds to step 106.

In step 106, a power reset of the main switching hub 42 is performed by a remote operation. That is, a reset command for a power reset of the main switching hub 42 is sent from the SCADA terminal to the backup remote I/O 48 via the backup switching hub 44. The backup remote I/O 48 sends the reset command to the power supply switch 50A, causing the power supply switch 50A to perform a power reset of the main switching hub 42.

Figure 4:
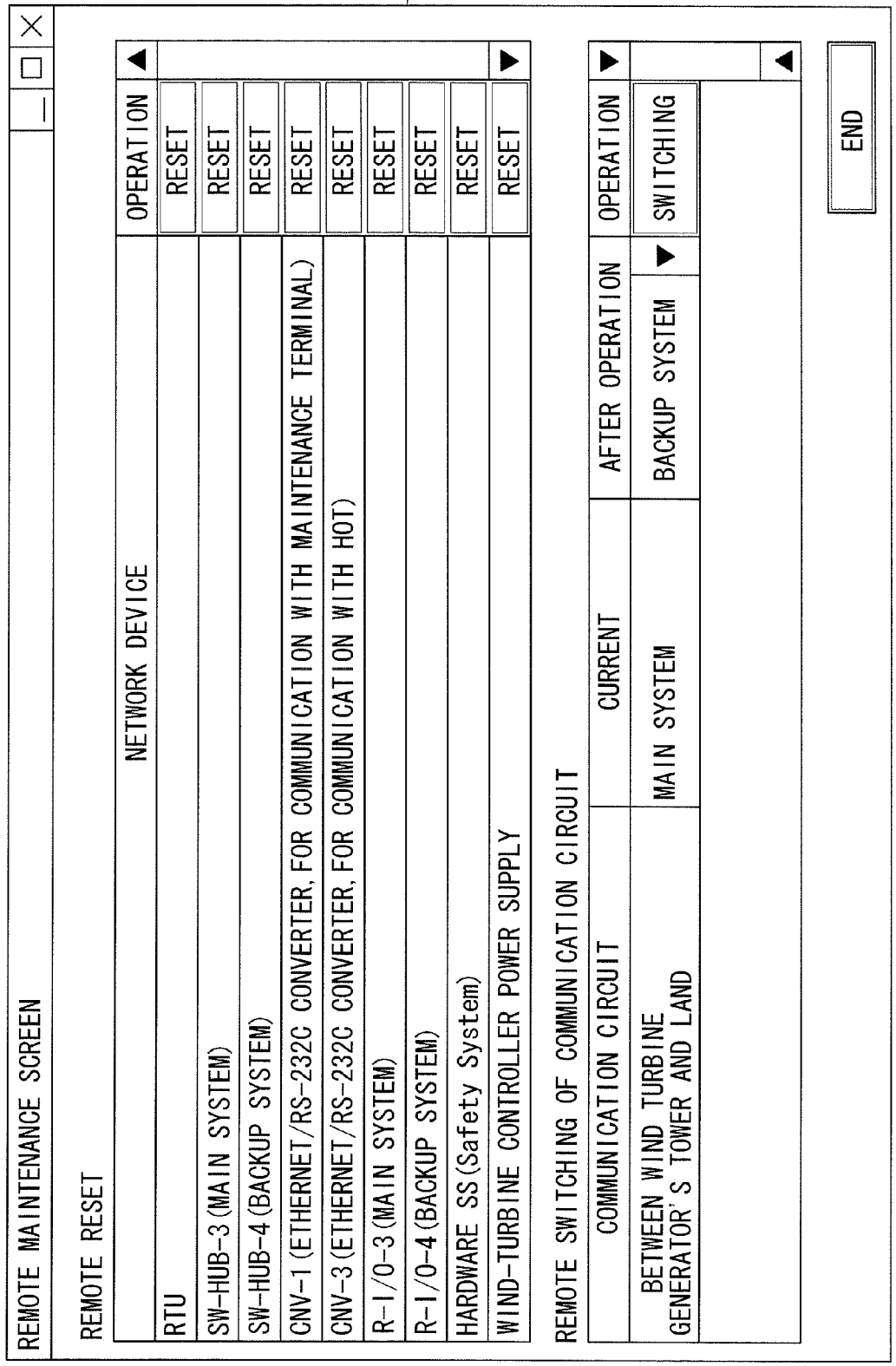
FIG. 4 is an illustration showing a screen that is displayed on a SCADA terminal when a power reset operation is performed by a remote operation in the embodiment of the present invention.

FIG. 4 shows a remote maintenance screen 69 that is displayed on the SCADA terminal when performing a power reset by a remote operation as described above.

In the remote maintenance screen 69 shown in FIG. 4, a list of network devices for which a power reset can be performed by a remote operation is displayed. The maintenance worker selects a network device for which a power reset is to be performed (clicks on "Reset") to perform a power reset by a remote operation.

Of the network devices displayed in the list, "RTU" indicates a power reset of the RTU 56, "SW-HUB-3" indicates a power reset of the main switching hub 42, "SW-HUB-4" indicates a power reset of the backup switching hub 44, "CNV-1" indicates a power reset of the converter 54A, "CNV-2" indicates a power reset of the converter 54B, "R-I/O-3" indicates a power reset of the main remote I/O 50, "R-I/O-4" indicates a power reset of the backup remote I/O 48, "Hard SS" indicates a power reset of a safety system implemented in hardware, and "Wind-turbine controller power supply" indicates a power reset of the wind-turbine controller 30, the switching hub 32A, the switching hub 32B, and the remote I/O 34B.

The remote maintenance screen 69 makes it possible to perform switching between the main switching hub 42 and the backup switching hub 44.

Then, in step 108, the maintenance worker or the network monitoring terminal 60 checks whether operating data transmitted from the wind turbine generator 12 via the SCADA system 14 is displayed on the SCADA terminal. If the operating data is displayed, the data transmission problem is considered to have been solved, and the procedure is exited. On the other hand, if the operating data is not displayed, the procedure proceeds to step 110.

In step 110, a power reset of the wind-turbine controller 30 is performed by a remote operation. That is, the maintenance worker selects "Wind-turbine controller power supply" in the remote maintenance screen 69 shown in FIG. 4 to perform a power reset of the wind-turbine controller 30, the switching hub 32A, and the switching hub 32B. Accordingly, a reset command for performing a power reset of the wind-turbine controller 30, the switching hub 32A, and the switching hub 32B is sent from the SCADA terminal to the backup remote I/O 48 via the backup switching hub 44. The backup remote I/O 48 sends the reset command to the power supply switch 50C, causing the power supply switch 50C to perform a power reset of the wind-turbine controller 30, the switching hub 32A, and the switching hub 32B.

Then, in step 112, the maintenance worker or the network monitoring terminal 60 checks whether operating data transmitted from the wind turbine generator 12 via the SCADA system 14 is displayed on the SCADA terminal. If the operating data is displayed, the data transmission problem is considered to have been solved, and the procedure is exited. On the other hand, if the operating data is not displayed, the procedure proceeds to step 114.

In step 114, since the data transmission problem has not been solved by a power reset, the maintenance worker visits the wind turbine generator 12 and the SCADA system 14 and repairs the network device experiencing the problem. Then, the procedure is exited. Alternatively, the maintenance worker may visit the wind turbine generator 12 and the SCADA system 14 on the occasion of the next maintenance work.

As described above, with the wind turbine generator system 10 according to this embodiment, the maintenance worker can perform a power reset of a network device from the SCADA system 16 without visiting the wind turbine generator 12 or the SCADA system 14 unless the device is in failure. This serves to reduce the time required to solve a data transmission problem.

Figure 5:
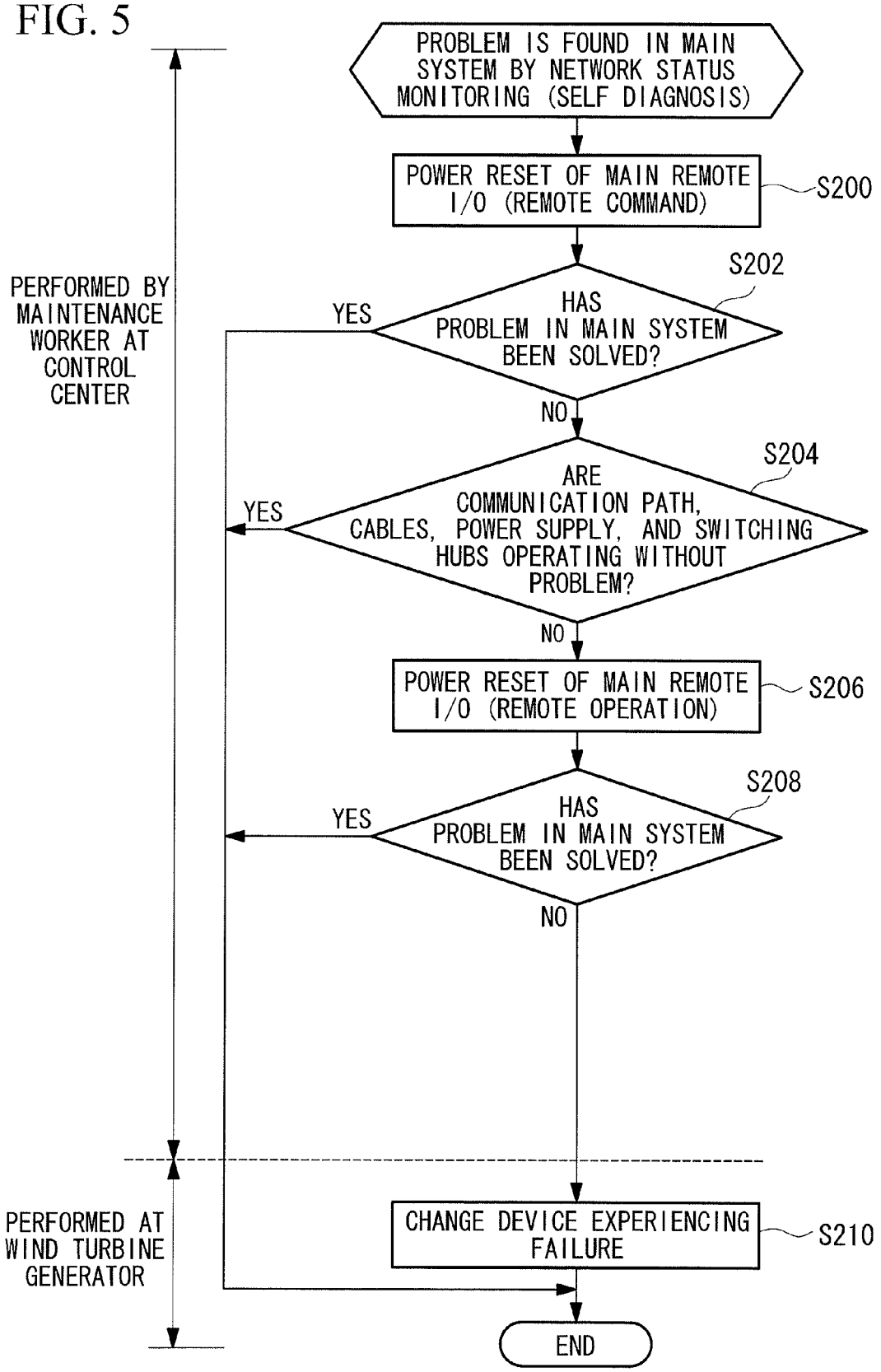
FIG. 5 is a flow chart showing a power reset procedure for a main remote I/O, which is executed when a problem is found in a main system by a self-diagnosis function of the main remote I/O in the embodiment of the present invention.

FIG. 5 shows a power reset procedure for the main remote I/O 50, which is executed when a problem is found in the main remote I/O 50 by the self-diagnosis function of the main remote I/O 50. In this case, upon discovery of a problem, the data transmission path is switched by a maintenance worker from the main switching hub 42 to the backup switching hub 44.

First, in step 200, a power reset of the main remote I/O 50 is performed. The power reset is performed by sending a reset command from the SCADA terminal to the main remote I/O 50 via the main switching hub 42 by using a remote command.

Then, in step 202, it is checked by the self-diagnosis function of the main remote I/O 50 whether the problem in the main system has been solved. If the problem has been solved, the procedure is exited. On the other hand, if the problem has not been solved, the procedure proceeds to step 204.

In step 204, by using the network monitoring terminal 60, etc., the maintenance worker checks whether there is any problem in the communication path, cables, power supply, switching hubs, etc. between the wind turbine generator 12 and the SCADA terminal via the SCADA system 14. If there is no problem, the procedure is exited, and the problem in the main system is solved by solving other causes (failure of the SCADA terminal, etc.). On the other hand, if there is any problem, the procedure proceeds to step 206.

In step 206, a power reset of the main remote I/O 50 is performed by a remote operation. That is, the maintenance worker selects "R-I/O-3" on the remote maintenance screen 69 shown in FIG. 4 to perform a power reset of the main remote I/O 50. Accordingly, a reset command for performing a power reset of the main remote I/O 50 is sent from the SCADA terminal to the backup remote I/O 48 via the backup switching hub 44. The backup remote I/O 48 sends the reset command to the power supply switch 50A associated with the main remote I/O 50, causing the power supply switch 50A to perform a power reset of the main remote I/O 50. Electric power is supplied to the main remote I/O 50 via a route from the power supply 52 to the power supply switch 50A and from the power supply switch 50A to the main remote I/O 50 in that order.

Then, in step 208, it is checked by the self-diagnosis function of the main remote I/O 50 whether the problem in the main system has been solved. If the problem has been solved, the procedure is exited. On the other hand, if the problem has not been solved, the procedure proceeds to step 210.

In step 210, since the problem in the main system has not been solved by a power reset, the maintenance worker visits the wind turbine generator 12 and the SCADA system 14 and repairs the network device experiencing the problem. Then, the procedure is exited. Alternatively, the maintenance worker may visit the wind turbine generator 12 and the SCADA system 14 on the occasion of the next maintenance work.

Figure 6:
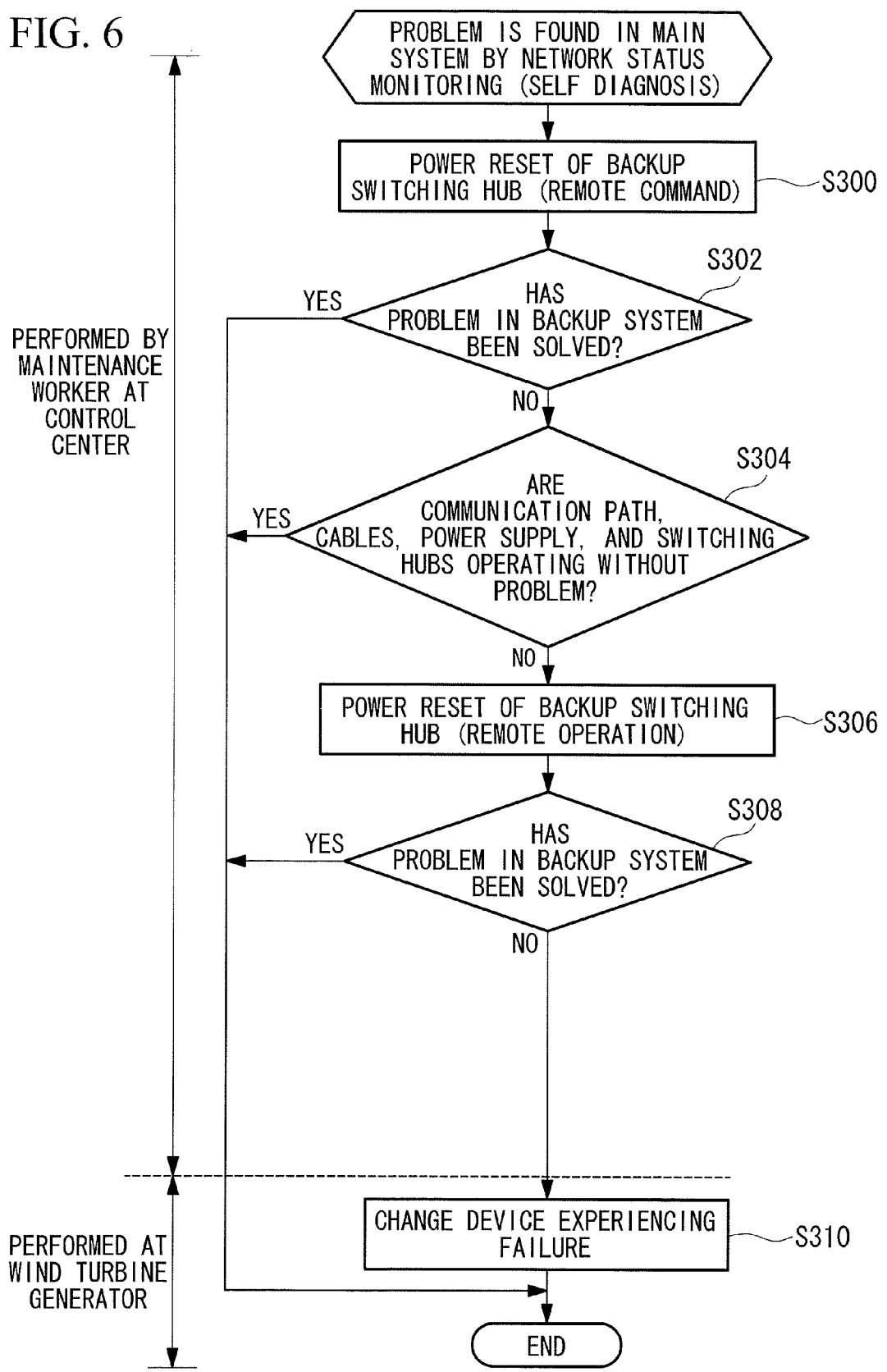
FIG. 6 is a flow chart showing a power reset procedure for a backup switching hub, which is executed when a problem is found in a backup system by the self-diagnosis function of the main remote I/O in the embodiment of the present invention.

FIG. 6 shows a power reset procedure for the backup switching hub 44, which is executed when a problem is found in the backup system by the diagnosis function of the network monitoring terminal 60. In this case, the data transmission path is maintained to be via the main switching hub 42.

First, in step 300, a power reset of the backup switching hub 44 is performed. The power reset is performed by sending a reset command from the SCADA terminal to the backup switching hub 44 by using a remote command.

Then, in step 302, it is checked by the diagnosis function of the network monitoring terminal 60 whether the problem in the backup system has been solved. If the problem has been solved, the procedure is exited. On the other hand, if the problem has not been solved, the procedure proceeds to step 304.

In step 304, by using the network monitoring terminal 60, etc., the maintenance worker checks whether there is any problem in the communication path, cables, power supply, switching hubs, etc. between the wind turbine generator 12 and the SCADA terminal via the SCADA system 14. If there is no problem, the procedure is exited, and the problem in the backup system is solved by solving other causes (failure of the SCADA terminal, etc.). On the other hand, if there is any problem, the procedure proceeds to step 306.

In step 306, a power reset of the backup switching hub 44 is performed by a remote operation. That is, the maintenance worker selects "SW-HUB-4" in the remote maintenance screen 69 shown in FIG. 4 to perform a power reset of the backup switching hub 44. Accordingly, a reset command for performing a power reset of the backup switching hub 44 is sent from the SCADA terminal to the main remote I/O 50 via the main switching hub 42. The main remote I/O 50 sends the reset command to the power supply switch 50B associated with the backup switching hub 44, causing the power supply switch 50B to perform a power reset of the backup switching hub 44.

Then, in step 308, it is checked by the diagnosis function of the network monitoring terminal 60 whether the problem in the backup system has been solved. If the problem has been solved, the procedure is exited. On the other hand, if the problem has not been solved, the procedure proceeds to step 310.

In step 310, since the problem in the backup system has not been solved by a power reset, the maintenance worker visits the wind turbine generator 12 and the SCADA system 14 and repairs the network device experiencing the problem. Then, the procedure is exited. Alternatively, the maintenance worker may visit the wind turbine generator 12 and the SCADA system 14 on the occasion of the next maintenance work.

Figure 7:
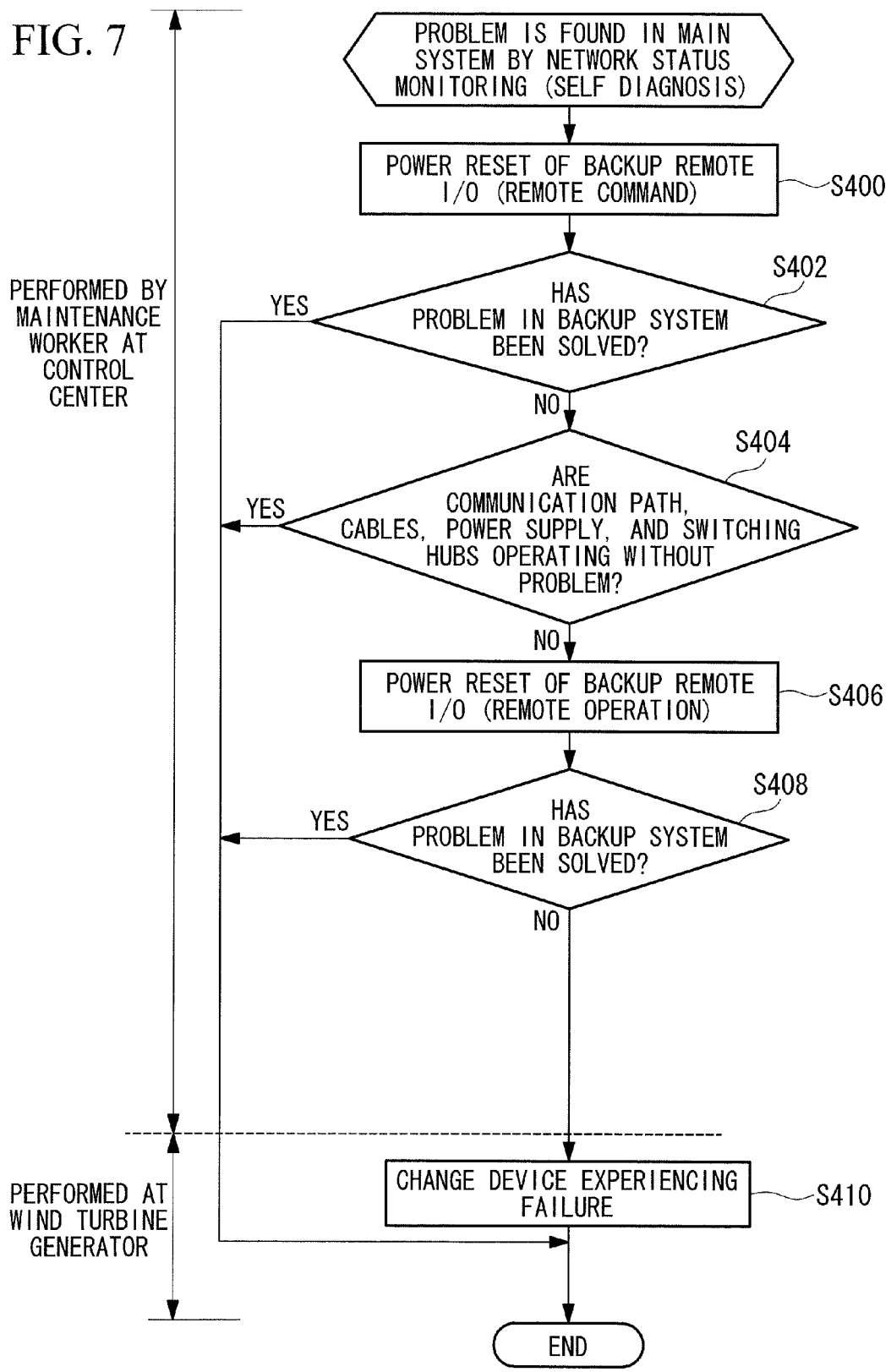
FIG. 7 is a flow chart showing a power reset procedure for a backup remote I/O, which is executed when a problem is found in the main system by the self-diagnosis function of the main remote I/O in the embodiment of the present invention.

FIG. 7 shows a power reset procedure for the backup remote I/O 48, which is executed when a problem is found in the backup remote I/O 48 by the diagnosis function of the network monitoring terminal 60. In this case, the data transmission path is maintained to be via the main switching hub 42.

First, in step 400, a power reset of the backup remote I/O 48 is performed. The power reset is performed by sending a reset command from the SCADA terminal to the backup remote I/O 48 via the backup switching hub 44 by using a remote command.

Then, in step 402, it is checked by the diagnosis function of the network monitoring terminal 60 whether the problem in the backup remote I/O 48 has been solved. If the problem has been solved, the procedure is exited. On the other hand, if the problem has not been solved, the procedure proceeds to step 404.

In step 404, by using the network monitoring terminal 60, etc., the maintenance worker checks whether there is any problem in the communication path, cables, power supply, switching hubs, etc. between the wind turbine generator 12 and the SCADA terminal via the SCADA system 14. If there is no problem, the procedure is exited, and the problem in the backup system is solved by solving other causes (failure of the SCADA terminal, etc.). On the other hand, if there is any problem, the procedure proceeds to step 406.

In step 406, a power reset of the backup remote I/O 48 is performed by a remote operation. That is, the maintenance worker selects "R-I/O-4" in the remote maintenance screen 69 shown in FIG. 4 to perform a power reset of the backup remote I/O 48. Accordingly, a reset command for performing a power reset of the backup remote I/O 48 is sent from the SCADA terminal to the main remote I/O 50 via the main switching hub 42. The main remote I/O 50 sends the reset command to the power supply switch 50B associated with the backup remote I/O 48, causing the power supply switch 50B to perform a power reset of the backup remote I/O 48.

Then, in step 408, it is checked by the diagnosis function of the network monitoring terminal 60 whether the problem in the backup remote I/O 48 has been solved. If the problem has been solved, the procedure is exited. On the other hand, if the problem has not been solved, the procedure proceeds to step 410.

In step 410, since the problem in the backup system has not been solved by a power reset, the maintenance worker visits the wind turbine generator 12 and the SCADA system 14 and repairs the network device experiencing the problem. Then, the procedure is exited. Alternatively, the maintenance worker may visit the wind turbine generator 12 and the SCADA system 14 on the occasion of the next maintenance work.

Next, a case where a maintenance operation of the wind turbine generator 12 is performed from the SCADA system 16 at a remote location in the wind turbine generator system 10 according to this embodiment will be described.

In a conventional wind turbine generator system 10, operations that can be performed on the wind turbine generator 12 from the SCADA system 16 via a SCADA system are limited to just activation and deactivation of the wind turbine generator 12, alarm resetting, etc.

Figure 8:
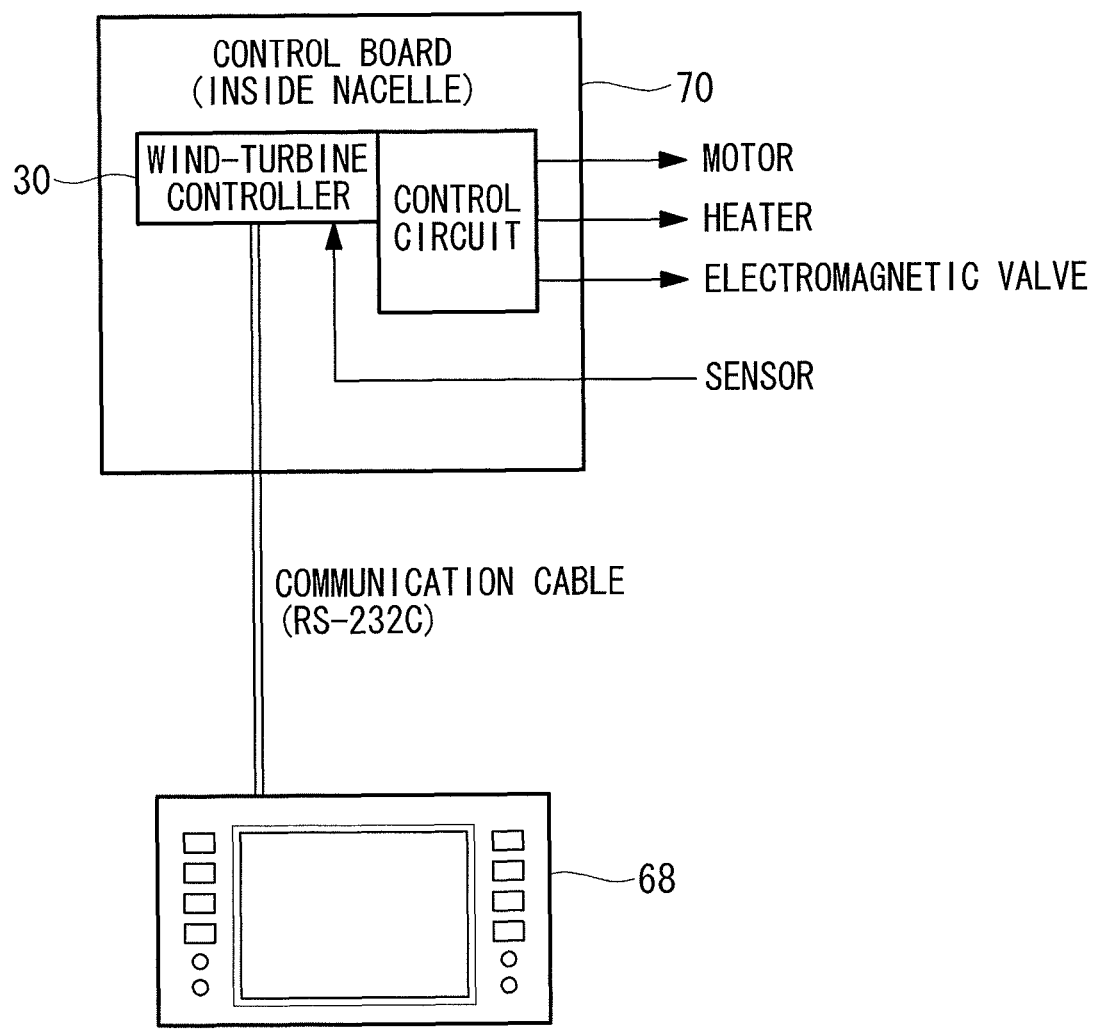
FIG. 8 is a diagram showing the conventional connection of a HOT and a wind-turbine controller.

Thus, when a maintenance operation of the wind turbine generator 12 is required, it has been the case that, as shown in FIG. 8, a maintenance worker visits the wind turbine generator 12 with the HOT 68, connects the HOT 68 to the wind-turbine controller 30 by RS-232C via a control board 70, and sends control signals to the wind-turbine controller 30 by using the HOT 68 to perform the maintenance operation of the wind turbine generator 12.

That is, in the conventional wind turbine generator system 10, it has been necessary to perform all maintenance operations at the wind turbine generator 12.

In contrast, in the case of the wind turbine generator system 10 according to this embodiment, the converters 54A and 54B that perform conversion between Ethernet communication and RS-232C communication and that are connected to the wind-turbine controller 30 or the converter controller 40 are connected to the ports of the main switching hub 42 and the backup switching hub 44 in the SCADA system 14. Furthermore, the converters 54C and 54D that perform conversion between Ethernet communication and RS-232C communication are connected to the ports of the switching hub 32C in the SCADA system 16. Thus, in the wind turbine generator system 10 according to this embodiment, by connecting the HOT 68 to the converter 54C in the SCADA system 16, a maintenance worker can perform a maintenance operation of the wind turbine generator 12 from the SCADA system 16.

Figure 9:
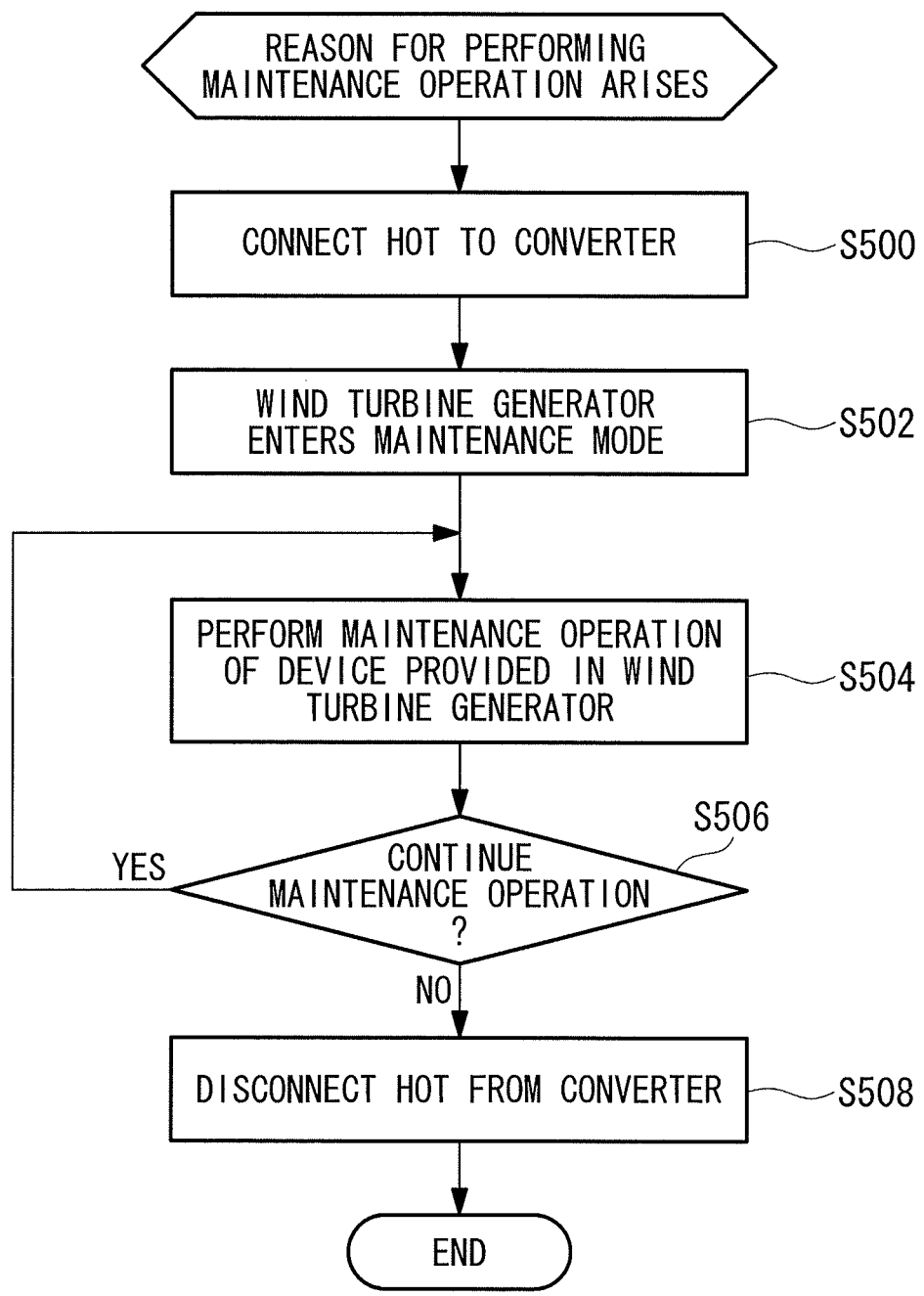
FIG. 9 is a flow chart showing a procedure that is executed when a reason for performing a maintenance operation arises in the embodiment of the present invention.

FIG. 9 shows a procedure that is executed in a case where a reason for performing a maintenance operation arises. For example, the case where a reason for performing a maintenance operation arises refers to a case where a remote reset is to be performed in the event of operation of a safety system, a case where yaw limit bypassing or yaw unwinding is to be performed because of an operation of a yaw limit switch triggered by cable twisting, a case where various electromagnetic valves or motors are to be operated independently in the event of an alarm being issued, or a case where an auxiliary machine in the cooling system is to be operated due to the occurrence of a problem that takes time for recovery.

First, in step 500, the HOT 68 is connected to the converter 54C.

Then, in step 502, by using the HOT 68, the wind turbine generator 12 is caused to enter a maintenance mode.

Figure 10:
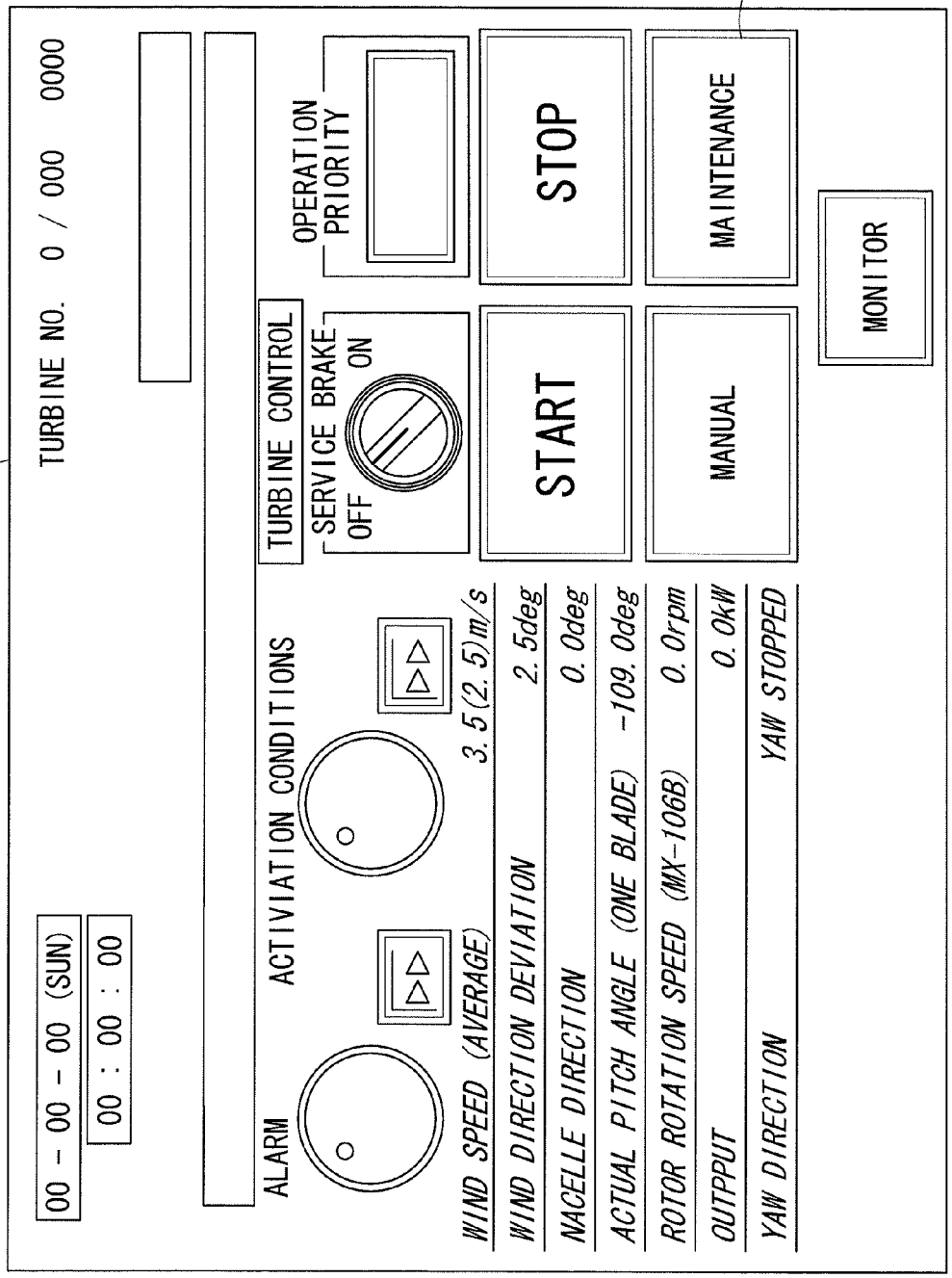
FIG. 10 is an illustration showing a menu screen that is displayed on a HOT in the embodiment of the present invention.

FIG. 10 shows an example of a menu screen 72 displayed on the HOT 68. The HOT 68 displays data representing the operating status of the wind turbine generator 12, such as the wind speed, wind direction, and nacelle direction. The HOT 68 displays "Start," "Stop," "Manual," "Maintenance," etc. The wind turbine generator 12 enters the maintenance mode when a button 74 displaying "Maintenance" is pressed.

Then, in step 504, a maintenance operation of a device provided in the wind turbine generator 12 is performed by using the HOT 68.

Figure 11:
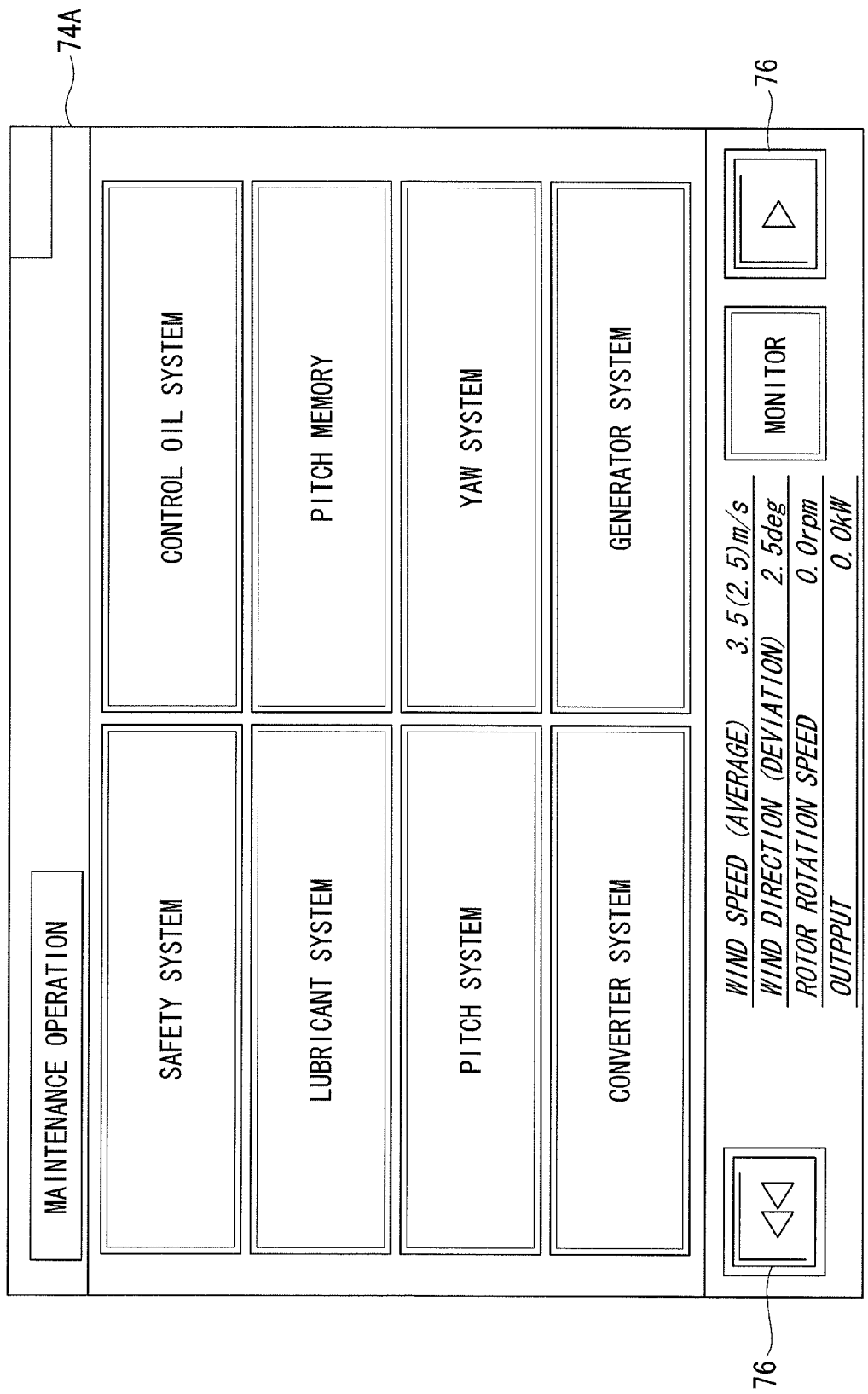
FIG. 11 is an illustration showing a menu screen that is displayed on the HOT when a maintenance operation is performed in the embodiment of the present invention.
Figure 12:
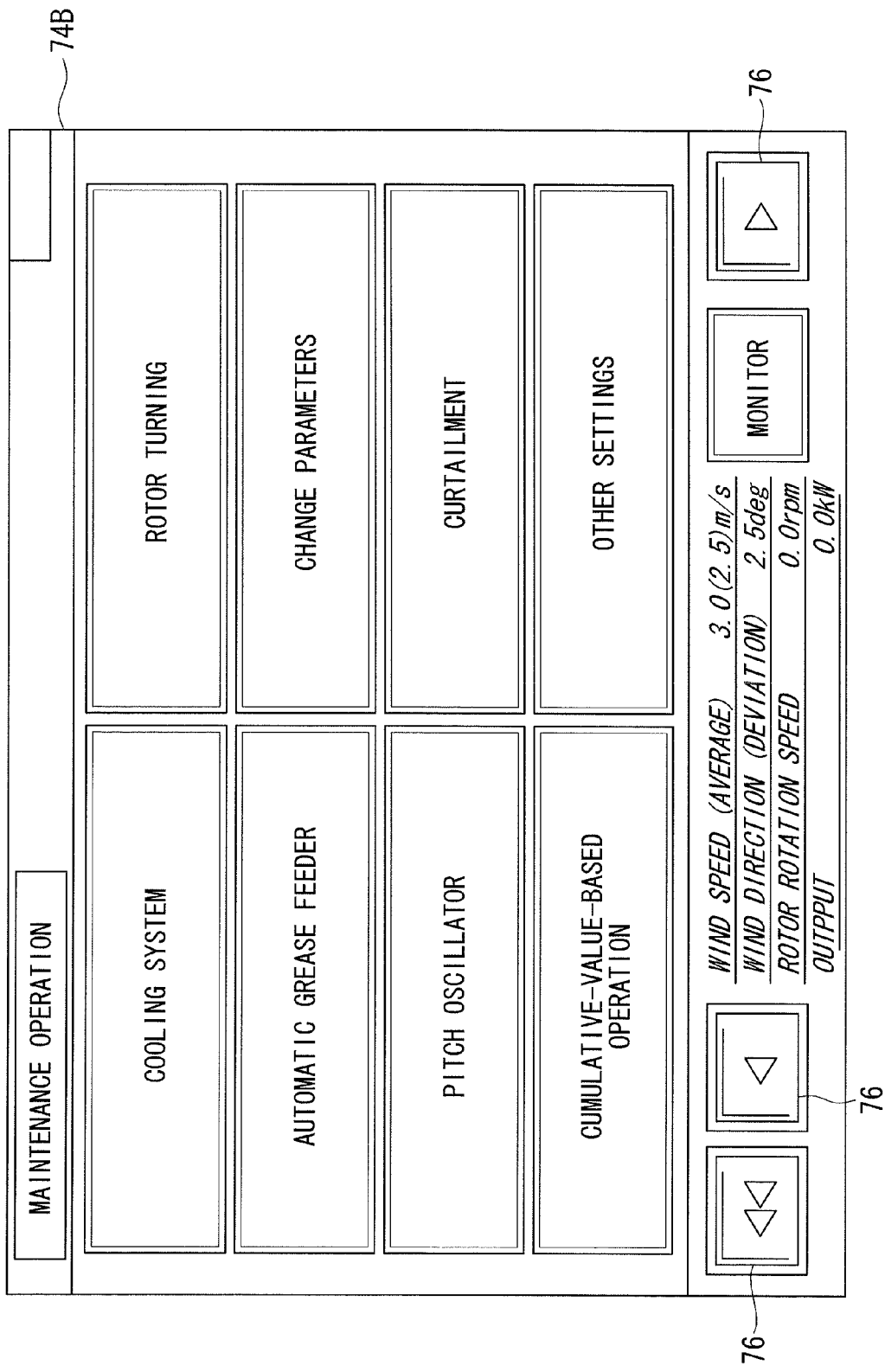
FIG. 12 is an illustration showing a menu screen that is displayed on the HOT when a maintenance operation is performed in the embodiment of the present invention.

FIG. 11 shows an example of a menu screen 74A that is displayed on the HOT 68 when a maintenance operation is performed. As shown in FIG. 11, in the menu screen 74A, a list of systems and devices for which a maintenance operation can be performed is displayed. When a page switching button 76 is pressed, the screen displayed on the HOT 68 is switched to another menu screen 74B, as shown in FIG. 12.

By pressing buttons displayed in the menu screens 74A and 74B, the maintenance worker selects a system or device for which a maintenance operation is to be performed, and the screen of the HOT 68 is switched to a maintenance operation screen.

The maintenance operation screen displays various operating buttons, etc. for performing maintenance. When the operating buttons are clicked on or otherwise operated, control signals are sent to the wind turbine generator 12.

FIG. 13 shows a maintenance operation screen 78A that is displayed on the HOT 68 when "Control oil system" shown in FIG. 11 is pressed. The maintenance operation screen 78A allows ON/OFF selection, etc. of various pumps, valves, etc.

Figure 14:
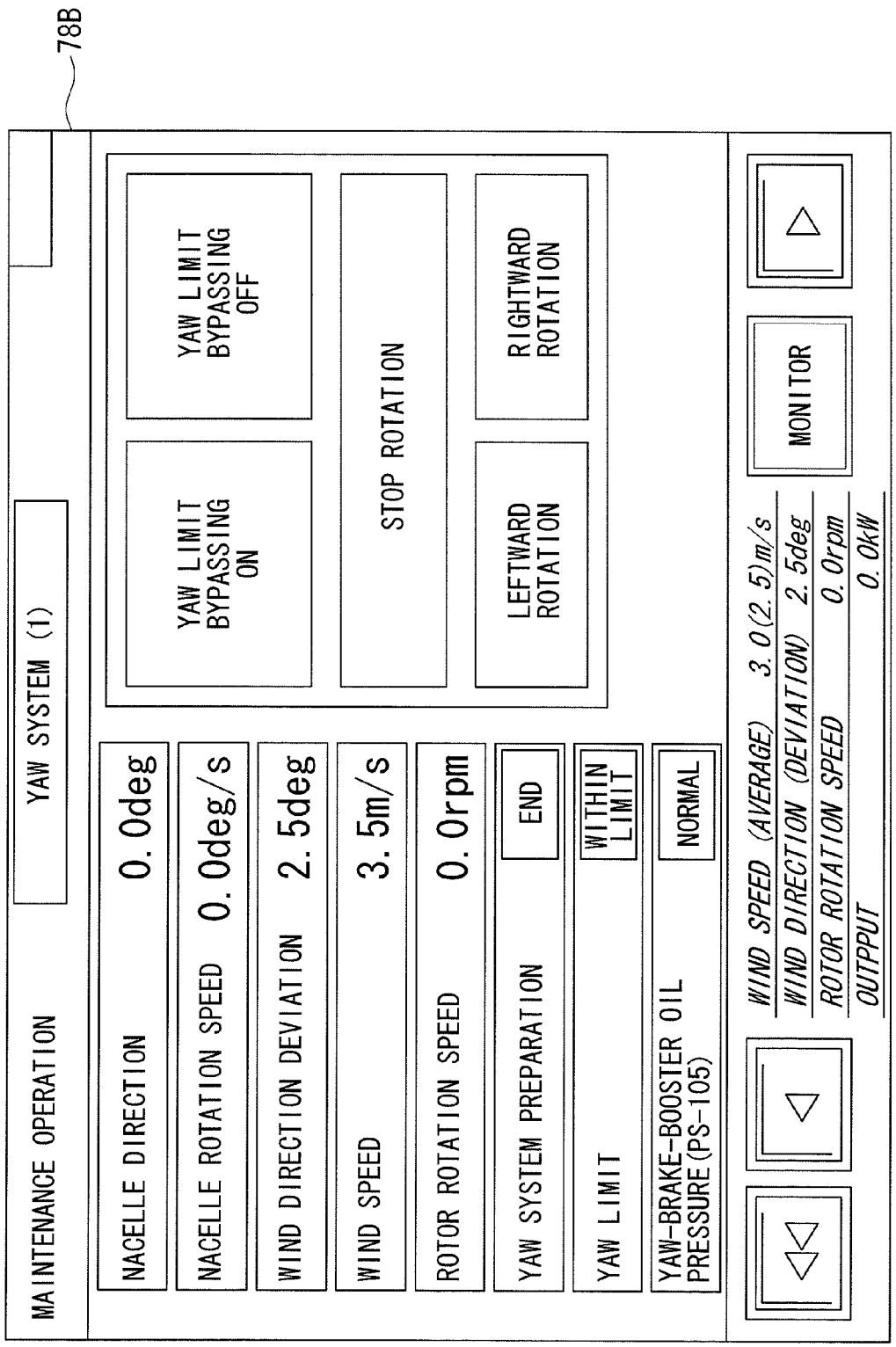
FIG. 14 is an illustration showing a maintenance operation screen that is displayed on the HOT when "Yaw system" displayed on the HOT is pressed in the embodiment of the present invention.

FIG. 14 shows a maintenance operation screen 78B that is displayed on the HOT 68 when "Yaw system" shown in FIG. 11 is pressed. The maintenance operation screen 78B allows operations relating to ON/OFF control of yaw limit bypassing and the rotating direction of the nacelle.

FIG. 15 shows a maintenance operation screen 78C that is displayed on the HOT 68 when "Cooling system" shown in FIG. 11 is pressed. The maintenance operation screen 78C allows ON/OFF selection, etc. of pumps, fans, etc.

"Other settings" in the menu screen shown in FIG. 12 include signal settings for trip data, modification of control software, collection or modification of control parameters, date and time setting for the wind-turbine controller 30, collection and modification of data stored in the non-volatile RAM (NVRAM) in the wind-turbine controller 30, etc.

Then, in step 506, upon completion of a predetermined maintenance operation, the maintenance worker determines whether or not to continue the maintenance work. If it is determined that the maintenance work is to be continued, the procedure returns to step 504. On the other hand, if it is determined that the maintenance work is to be finished, the procedure proceeds to step 508.

Then, in step 508, the HOT 68 is disconnected from the converter 54C. Then, the procedure is exited.

As described above, in the SCADA system 14 according to this embodiment, the main switching hub 42 and the backup switching hub 44 have ports for sending control signals issued from the HOT 68 to the wind turbine generator 12. Thus, it is possible to perform various maintenance operations of the wind turbine generator 12 from a remote location by using the HOT 68.

Furthermore, the maintenance terminal 36D has a function similar to that of the HOT 68. Since the maintenance terminal 36D is connected to the converter 54D, it is possible to perform maintenance operations of the converter controller 40 from the SCADA system 16 by using the maintenance terminal 36D.

In the case where the communication standard for the wind-turbine controller 30 and the converter controller 40 is Ethernet communication instead of serial communication, it is possible to perform remote maintenance operations without using the converters 54A to 54D. Furthermore, maintenance operations can also be performed from the client terminals 66 connected to the Internet 65 in a wired or wireless manner, or by using cellular phones.

Although the present invention has been described in the context of the above embodiment, the technical scope of the present invention is not limited to the scope of the above-described embodiment. Various modifications and improvements can be made to the embodiment without departing from the spirit of the present invention, and implementations with these modifications or improvements are also encompassed in the technical scope of the present invention.

For example, although the wind turbine generator 12 and the SCADA system 14 are installed on the offshore area in the above-described embodiment, the present invention is not limited to this embodiment, and the wind turbine generator 12 and the SCADA system 14 may be installed on land.

Furthermore, the switching by the network switch 46 between the main switching hub 42 and the backup switching hub 44 may be performed in response to a switching command automatically input from a SCADA terminal to the backup remote I/O 48 via the backup switching hub 44 when the network monitoring terminal 60 discovers a problem in the main system.

Furthermore, the various procedures in the above-described embodiments are only examples, and unnecessary steps may be omitted, new steps may be added, or the orders of steps may be changed without departing from the spirit of the present invention.

REFERENCE SIGNS LIST

10 Wind turbine generator system
12 Wind turbine generator
14 SCADA system
16 Control center
36D Maintenance terminal
42 Main switching hub
44 Backup switching hub
46 Network switch
48 Backup remote I/O
50 Main remote I/O
68 HOT

The invention claimed is:

1. A remote monitoring apparatus that sends and receives data between a wind turbine generator and an information processing apparatus, the remote monitoring apparatus comprising:
a main switching hub that relays transmission data between the wind turbine generator and the information processing apparatus;
a backup switching hub that relays transmission data between the wind turbine generator and the information processing apparatus;
a switching unit for performing switching between the main switching hub and the backup switching hub for relaying transmission data between the wind turbine generator and the information processing apparatus; and
a first controlling unit that causes the switching unit to perform switching based on a switching signal from the information processing apparatus or any other information processing apparatus input via the backup switching hub,
wherein the first controlling unit powers off and on the main switching hub based on a reset signal from the information processing apparatus or any other information processing apparatus input via the backup switching hub.

2. A remote monitoring apparatus according to claim 1, wherein the first controlling unit powers off and on a wind-turbine controller that controls the wind turbine generator, based on a reset signal from the information processing apparatus or any other information processing apparatus input via the backup switching hub.

3. A remote monitoring apparatus according to claim 1, further comprising a second controlling unit that is connected to the main switching hub and that powers off and on the backup switching hub based on a reset signal from the information processing apparatus or any other information processing apparatus input via the main switching hub.

4. A remote monitoring apparatus according to claim 1, wherein operating data representing the operating status of the wind turbine generator, received from a wind-turbine controller that controls the wind turbine generator, is sent via a communication circuit to an information processing apparatus installed at a remote location.

5. A remote monitoring apparatus according to claim 1, wherein the main switching hub and the backup switching hub are provided with ports for sending to the wind turbine generator control signals sent from a portable information processing terminal for operating the wind turbine generator.

6. A wind turbine generator system comprising:
a wind turbine generator; and a remote monitoring apparatus according to claim 1 which are installed on an offshore area, wherein the first controlling unit causes the switching unit to perform switching based on a switching signal from an information processing apparatus installed on land.

7. A method of controlling a remote monitoring apparatus that includes, for the purpose of sending and receiving data between a wind turbine generator and an information processing apparatus, a main switching hub that relays transmission data between the wind turbine generator and the information processing apparatus, a backup switching hub that relays transmission data between the wind turbine generator and the information processing apparatus, and a switching unit for performing switching between the main switching hub and the backup switching hub for relaying transmission data between the wind turbine generator and the information processing apparatus, wherein switching by the switching unit is performed based on a switching signal from the information processing apparatus or any other information processing apparatus input via the backup switching hub and powering off and on the main switching hub is performed based on a reset signal from the information processing apparatus or any other information processing apparatus input via the backup switching hub.

* * * * *